United States Patent [19]

Heitz et al.

[11] Patent Number: 4,839,436

[45] Date of Patent: Jun. 13, 1989

[54] POLYPHENYLENE OXIDES WITH HIGH MOLECULAR WEIGHT AND A PROCESS FOR THEIR PREPARATION AND THEIR USE

[75] Inventors: Walter Heitz, Kirchhain; Karl-Heinrich Schneider, Marburg, both of Fed. Rep. of Germany

[73] Assignee: Bayer Aktiengesellschaft, Leverkusen-Bayerwerk, Fed. Rep. of Germany

[21] Appl. No.: 145,822

[22] Filed: Jan. 19, 1988

[30] Foreign Application Priority Data

Jan. 31, 1987 [DE] Fed. Rep. of Germany ....... 3702919
Mar. 13, 1987 [DE] Fed. Rep. of Germany ....... 3708109

[51] Int. Cl.$^4$ ............................................. C08G 65/48
[52] U.S. Cl. ..................................... 525/397; 525/443
[58] Field of Search ................................ 525/397, 443

[56] References Cited

U.S. PATENT DOCUMENTS

| 3,382,212 | 5/1968 | Price et al. | 260/47 |
| 3,491,058 | 1/1970 | Taylor et al. | 260/47 |
| 4,654,405 | 3/1987 | Jalbert et al. | 525/397 |
| 4,714,657 | 12/1987 | Quinn et al. | 525/443 |
| 4,741,864 | 5/1988 | Avakian et al. | 525/443 |

*Primary Examiner*—John Kight
*Assistant Examiner*—T. Mason
*Attorney, Agent, or Firm*—Connolly and Hutz

[57] ABSTRACT

This invention relates to polyphenylene oxides with high molecular weight (PPO) and to a process for their preparation by the reaction of polybasic aromatic carboxylic acids or their derivatives with polyphenylene oxides, and their use for the modification of plastics.

7 Claims, No Drawings

POLYPHENYLENE OXIDES WITH HIGH MOLECULAR WEIGHT AND A PROCESS FOR THEIR PREPARATION AND THEIR USE

The present invention relates to polyphenylene oxides with high molecular weight (PPO) and to a process for their preparation by the reaction of polybasic aromatic carboxylic acids or their derivatives with polyphenylene oxides, and to their use for the modification of plastics.

Polyphenylene oxides and their preparation are known (e.g. U.S. Pat. No. 3,491,058, 3,507,832 and 3,455,736).

It is also known to react certain polyphenylene oxides to form acyl-coupled polymers (e.g. DE-OS No. 2,822,859 and 2,822,856). The possible ranges of application and the properties of such polymers, however, do not always satisfy all requirements.

It has now been found that polyphenylene oxides with high molecular weight obtained from polybasic aromatic carboxylic acids and polyphenylene oxides have improved properties.

The present invention relates to polyphenylene oxides with high molecular weight corresponding to the following formula (I)

wherein
m stands for the number 2, 3 or 4,
Ar denotes an optionally substituted aromatic group having from 6 to 20 carbon atoms and
R denotes a polyphenylene oxide chain corresponding to the following formula (II)

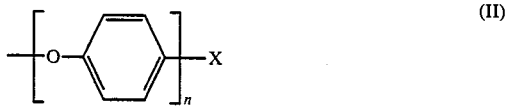

wherein
X denotes a halogen such as Cl or Br and
n stands for an integer with a value from 10 to 10,000, preferably from 100 to 5000.

The polyphenylene oxides according to this invention have molecular weights of about 2000 to 3,500,000, preferably from 20,000 to 1,800,000, and inherent viscosities of from 0.3 to 3.0 dl/g, preferably from 0.3 to 0.5 gl/g (determined in N-methylpyrrolidone at 30° C).

In formula (I), Ar preferably stands for an aromatic group with from 6 to 10 carbon atoms, most preferably an aromatic group with 6 carbon atoms, a group corresponding to the following formula (Ia) being particularly preferred:

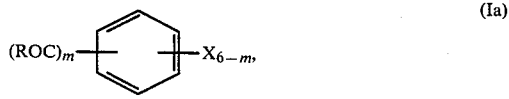

wherein
m has the meaning indicated for formula I and
X denotes hydrogen (H) or a substituent such as a halogen (Cl, Br) or an alkyl group with from 1 to 4 carbon atoms and
R has the meaning indicated for formula (I).

The invention further relates to a process for the preparation of polyphenylene oxides of formula (I)

wherein
m stands for the number 2, 3 or 4,
Ar denotes an aromatic group with from 6 to 20 carbon atoms and
R denotes a polyphenylene oxide chain corresponding to formula (II)

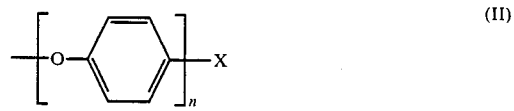

wherein
X stands for a halogen such as Cl or Br and
n stands for an integer with a value from 10 to 10,000, preferably from 100 to 5000, characterised in that polybasic aromatic carboxylic acids or derivatives thereof corresponding to formula (III) and the anhydrides of the corresponding carboxylic acids corresponding to formula (IIIa)

Ar(COY)$_m$    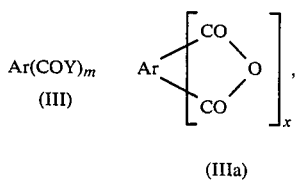
(III)
               (IIIa)

in which
Ar and m have the meanings indicated for formula (I) and
x stands for the number 1 or 2 and
Y denotes a halogen such as Cl or Br, an OH group or a $C_6$-$C_{10}$-aryloxy group or a $C_1$-$C_{10}$-alkoxy group are reacted with polyphenylene oxides corresponding to the following formula (IV)

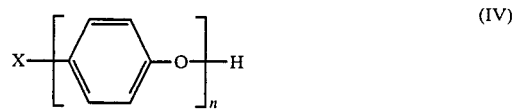

wherein
X and n have the meaning indicated for formula (II).

In formula (III), Y preferably stands for Cl, OH or O-phenyl (phenolate).

As carboxylic acids or derivatives thereof corresponding to formula (III) or anhydrides thereof corresponding to formula (IIIa) there may be used the free acids, the acid halides, esters, semiesters, etc., e.g. terephthalic acid, terephthalic acid dichloride, terephthalic acid diphenylester, benzene-1,3,5-tricarboxylic acid, benzene1,3,5-tricarboxylic acid triphenylester, benzene-1,2,4,5-tetracarboxylic acid, benzene-1,2,3,5-tetracarboxylic acid, phthalic acid, phthalic acid anhydride, naphthalene1,2-dicarboxylic acid, anthracene-9,10-dicarboxylic acid, etc.

The polyphenylene oxides of formula (IV) may be known polyphenylene oxides prepared by known methods (e.g. GB-PS No. 1 053 053 or US Pat. No. 3 491 058).

The reaction of the carboxylic acids or their derivatives corresponding to formula (III) or their anhydrides corresponding to formula (IIIa) with polyphenylene oxides corresponding to formula (IV) may be carried out in the presence or absence of a solvent. In either case, the reaction is carried out in the absence of oxygen and at a temperature of from 150° to 300° C., preferably from 180° to 220° C., optionally at a pressure of from 1 to 10 bar, and in the absence of water.

The solvents used may be organic solvents which are inert under the reaction conditions, e.g. ethers such as diphenylether, hydroquinone dimethylether, diethylene glycol dimethylether (glyme), lactams such as N-methylpyrrolidone, chlorinated hydrocarbons such as 1,2,4-trichlorobenzene, sulphones such as diphenylsulphone, etc.

Additives may be added to the reaction mixture, e.g. the usual transesterification catalysts, bases such as alkali metal carbonates or heterocyclic nitrogen compounds, etc. The choice of additives should be made according to the choice of carboxylic acid or its derivative of formula (III) or of its anhydride of formula (IIIa). When using an acid chloride as derivative of formula (III), for example, it may be advantageous to use a base. When an ester is used as derivative of an acid of formula (III), it may be advantageous to add a transesterification catalyst, e.g. a Lewis acid such as a metal salt (e.g. $SnCl_2$).

For the reaction of the acids of formulae (III) and (IIIa) with the polyphenylene oxides of formula (IV), all the components of the reaction may be added together, and the oxygen is then removed by passing inert gas through the reaction mixture or applying a vacuum and flooding with inert gas. The mixture is then heated to the reaction temperature. The inert gas used may be, for example, $N_2$ or a noble has such as Ar, etc.

When carboxylic acid halides are used as derivatives of formula (III), it may be advantageous to dissolve the carboxylic acid halide in small quantities of a suitable solvent, e.g. tetrahydrofuran, and add it to the polyphenylene ether of formula (IV).

The reaction of the carboxylic acid or of the derivative of formula (III) or of the anhydride of formula (IIIa) with the polyphenylene ether of formula (IV) may be stopped by pouring it into or adding a mixture of alcohol-ether-concentrated aqueous acid (e.g. methanol-diethyletherconcentrated aqueous HCl). The novel polyphenylethers precipitate and may be separated, for example, by filtration. They may then be further purified by conventional methods of reprecipitation (e.g. dissolving in N-methylpyrrolidone and precipitating with methanol/conc.HCl).

Conventional fillers, modifying agents, pigments, stabilizers, flame retarding additives, etc. may be added to the polyphenylene oxides according to the invention. Their properties are improved by virtue of their high molecular weight, e.g. their processing properties. They may be worked up, for example, into moulded parts, for example by injection moulding or extrusion. They may also be mixed and worked up with other plastics. They are particularly suitable for the preparation of high melting thermoplasts. Furthermore, the novel polyphenylene ethers may be reacted with other polymers to form various types of block copolymers.

EXAMPLE

The polyphenylene ether of formula (II) may be prepared, for example, by well-known methods from alkali metal-4-halogenphenolates with exclusion of oxygen and moisture (protons) as follows:

50 ml of abs. hydroquinone dimethylether are added to 15.63 g of potassium 4-bromophenolate which has been prepared under nitrogen and dried, and the mixture is heated. Polymerisation sets in on addition of a catalyst solution prepared from 50 mg of CuCl and 3 ml of abs. pyridine. The reaction temperature is in the region of 100° to 250° C., a temperature of 200° C. being found to be the most effective. Condensation is stopped by pouring the reaction solution into a mixture of methanol, diethylether and conc. HCl. The product reprecipitated from N-methylpyrrolidone has an inherent viscosity of 0,4 dl/g (N-methylpyrrolidone/30° C.). Preparation of the polyphenylene ether of formula (I):

(a) from acid chloride of formula (III) and PPO of formula (IV). 0.5 g of a polyphenylene ether having an inherent viscosity of 0.299 dl/g at 200° C. is dissolved in 10 ml of hydroquinone dimethylether and 0.2 ml of abs. quinoline is added. 15 mg of tetraphthalic acid dichloride dissolved in 75 ml of abs. THF (=anhydrous tetrahydrofuran) are slowly added dropwise so that the THF immediately distils off. The precipitated polyphenylene ether has a distinctly raised inherent viscosity, amounting to 0.42 dl/g (in NMP/30° C.) and improved thermal resistance, as determined by thermogravimetric tests.

(b) from acid esters of formula (III) and PPO of formula IV 1 g of a polyphenylene ether having an inherent viscosity of 0.299 dl/g and 17 mg of tetraphthalic acid diphenyl ester are dissolved in 20 ml of anhydrous hydroquinone dimethylether at 200° C. under inert gas. 0.14 mg of magnesium activated with iodine is added. The reaction temperature is maintained at 200° C. for 8 hours. The washed and dried polyphenylene ether which has been precipitated from a mixture of methanol and diethylether is found to have an inherent viscosity of 0.351 dl/g (in NMP/30° C).

We claim:
1. Polyphenylene oxide with high molecular weight corresponding to the formula

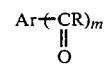

wherein
  m represents the number 2, 3 or 4,
  Ar represents an aromatic group with 6 to 20 carbon atoms,
  R represents a polyphenylene oxide chain of the formula

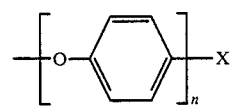

wherein
  X represents a halogen and
  n represents an integer with a value from 10 to 10,000.

2. Polyphenylene oxide according to claim 1 wherein X of the polyphenylene oxide chain R is chloro or bromo.

3. Polyphenylene oxide according to claim 1 wherein n represents an integer with a value from 100 to 5000.

4. Process for the preparation of polyphenylene oxide corresponding to the formula

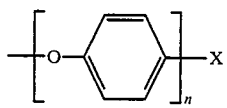

wherein
m represents the number 2, 3 or 4,
Ar represents an unsubstituted or substituted aromatic group having 6 to 20 carbon atoms,
R represents a polyphenylene oxide chain corresponding to the formula

wherein
X represents a halogen and
n represents an integer with a value from 10 to 10,000, characterised in that polybasic aromatic carboxylic acid corresponding to formula (III) and the anhydride of the corresponding carboxylic acid corresponding to formula (IIIa)

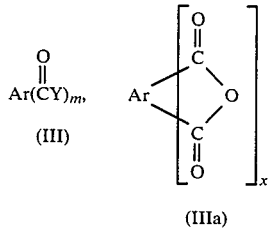

wherein
Ar and m have the meanings indicated above,
x represents the number 1 or 2 and
Y represents a halogen, an OH group, a $C_6$–$C_{10}$-aryloxy group or a $C_1$–$C_{10}$-alkoxy group are reacted with polyphenylene oxide corresponding to the formula

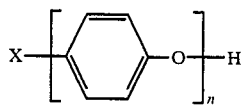

wherein
X and n have the meanings indicated for above.

5. The process according to claim 4 wherein X of the polyphenylene oxide chain R is chloro or bromo.

6. The process according to claim 4 wherein n represents an integer with a value from 100 to 5,000.

7. Injection moulded or extruded articles which contain the polyphenylene oxide according to claim 1.

* * * * *